Feb. 8, 1966     F. BERGANN     3,233,365
SOILLESS PLANT CULTURE SUBSTRATE
Filed April 11, 1963
FIG. 1
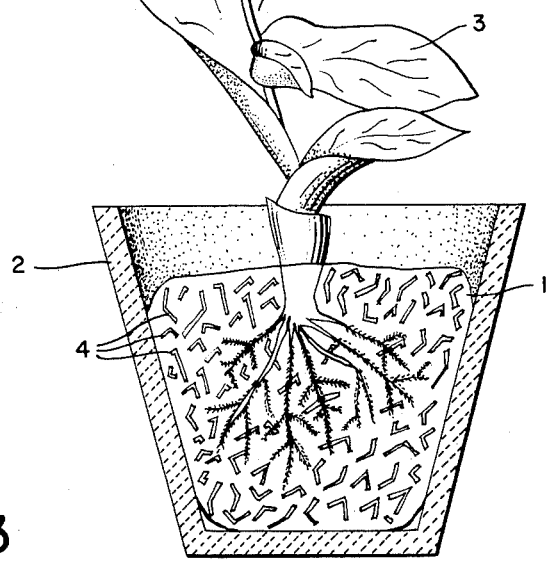
FIG. 2
FIG. 3
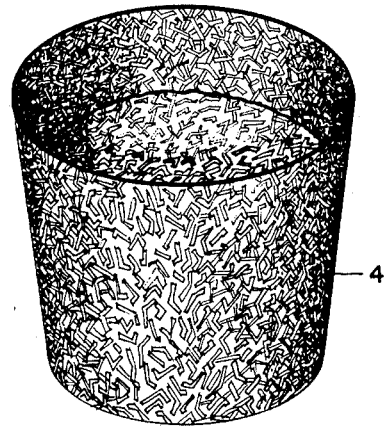
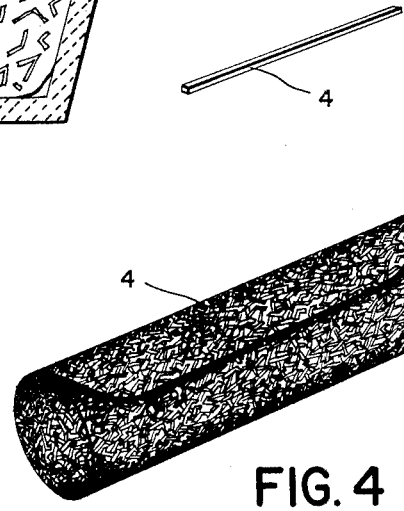
FIG. 4
INVENTOR.
FRIEDRICH BERGANN __United States Patent Office__

3,233,365
Patented Feb. 8, 1966

3,233,365
SOILLESS PLANT CULTURE SUBSTRATE
Friedrich Bergann, Potsdam-Babelsberg, Germany, assignor to Elastonwerk, Saller & Co. KG., Friedrichroda, Thuringia, Germany
Filed Apr. 11, 1963, Ser. No. 272,460
6 Claims. (Cl. 47—1.2)

The present invention concerns a soilless plant culture substrate for using a nutrient solution, wherein small plastic rods are used as a support for plants and roots.

Numerous carrier substances have heretofore been proposed for hydroponic cultures. Of these, ordinary quartz gravel, in spite of its light weight, is still in use owing to its abundance and the low cost resulting therefrom. Those substances are considered to be best suited which exhibit capillary action owing to the porosity of the individual particles therein, so as to absorb and retain water or a nutrient solution. This is the case with the crumbling structure of mellow arable soil.

As examples of natural materials of this kind one may mention white peat of different structures and origins, pumice gravel and foamed lava of medium granulation and also coarse-structure exfoliated vermiculite. However, synthetic products or industrial wastes such as synthetic resin foams or blast-furnace slag in the form of suitably sized lumps, and finally also brick chips are materials which have been proposed for hydroponic cultures on account of their porosity.

It can be shown, however, that the value of a carrier substance is not determined by the porosity of its individual particles. In the hydroponic process, which at present has reached its maximum development as a mineral culture, the superior outputs thereof being caused by the frequent changes between accumulation and discharge of the nutrient solution, any absorptive capacity of the substrate may be renounced. In the case of permanent accumulation perfectly non-porous particles may be used, such as quartz gravel chips, solid lumps of plastics or even plastics granulate of spherical or cylindrical shape of the individual particles.

Another yardstick for judging plant substrates, not considered so far, leads us into another direction. When charging or feeding a carrier substance into culture vessels or basins, the individual particles are to be so joined that between them a possibly large number of relatively spacious intercommunicating cavities are formed. Thus a highly porous yet solid carrier framework is formed in which the whole root system of the cultivated plant may develop unobstructedly and spread out, still being firmly anchored.

To observe the known oxygen requirement of the living plant root it is necessary for the cavities of the carrier framework not only to be flooded at optionally frequent intervals with a nutrient solution, but also adequate regular ventilation to be ensured without changing, however, the positional relationship of the individual particles to one another and hence to the configuration and size of the cavities of the substrate.

Thus, if the porosity of the individual particles may fundamentally be dispensed with, then under conditions of mineral culture it may even become too much of an interference. This is so if the gas-filled cavities do not communicate with the outside so that they can neither be filled with nutrient solution nor be penetrated by the roots or root hairs. Despite evacuation under water, such porous lumps retain a gas charge in their cavities and remain buoyant owing to their specific gravity. When the culture is flooded, the cohesion of the individual particles of the plant bed is lost, the anchorage of the roots considerably impaired and the root themselves liable to be damaged. For these reasons, the specific gravity of ideal carrier substances should always lie above unity, in order not to impair particle usefulness by buoyancy.

If, however, porous carrier substances actually develop high capillary action on account of open cavity systems in their individual particles, adequate water and nutrient salt supplies will indeed be available, but maximum ventilation of the roots within the still wet substrate need not be ensured by adding chalk.

All substrates having a good absorptive capacity and therefore remaining wet over a long period have, incidentally, the disadvantage that in certain time they become inhabited by algae, whereby the nutrient solution is changed in an undesired manner, namely it is consumed prematurely and is moreover choked with slime. Particularly in the case of light-colored or colorless substrates which permit light to penetrate comparatively deeply into the plant bed, but even in permanently banked-up quartz gravel, disturbing algae growth cannot be avoided.

Thus, if the required structure of the carrier framework is not based on a porosity existing from the start of the individual particles, but moreover is built up only by joining the individual particles when charging or feeding the substrate into the culture vessels, then it is obvious that the occurrence of particularly suitable cavity structures in the plant bed is dependent not only upon the shape but also the size of the individual particles.

Purely mathematically it may be proved that when charging a space of a certain size with strictly spherical individual particles, the ratio between the overall volume of the inserted spherical members and that of the created communicating cavities remains constant even if the diameters of the spherical members are permitted to vary between extreme volumes. Also, the reduction in diameter of the spherical members causes their number, the size of their overall area, and also the number of cavities thus formed to increase considerably, whilst, on the other hand, the inner widths of these cavities are reduced in size to such an extent that when going below a certain diameter of the spherical members, harmful capillary actions occur.

For example, the use of finest grained quartz sand for hydroponic purposes fails owing to the fact that root breathing is practically eliminated because this substrate not only retains the nutrient solution in a capillary manner, but constantly sucks it up so that no fresh air can reach the roots. In the case of substrates in spherical, granular or lump form, particle diameters of at least 3 to 6 millimeters are, therefore, necessary, whilst the more or less irregular shape of the individual particles is of no consequence and may be left to chance. In both stated orders of magnitude of solid particles, apparently, moisture retention, on the one hand, and fresh air supply, on the other hand, are at a compromising but still tolerable ratio for the roots. Above all, the intercommunicating cavities are wide and composed of many members adequately to permit sufficient root development throughout the substrate.

Hence if the value of a carrier substance or substrate had to be judged according to the overall volume and also the inner width of the cavities between the individual particles, then the particular planting substance superior to all others will be that which permits the maximum cavity volume to be formed, offering nevertheless maximum anchorage for the root system.

The object of the present invention is to provide such a carrier or soilless substrate, whilst avoiding the disadvantages of hitherto known carriers.

According to a major feature of the present invention, the novel soilless plant cultivating substrate, adapted for using a nutrient solution, is charcterized in that small plastic rods are used as a plant substrate, said rods preferably having an approximate width of 0.5 to 2 millimeters, a thickness of 0.1 to 1 mm. and a length of 15 to 80 mm.

Other objects and advantages of the invention will be appreciated and more fully understood with reference to the following description, when considered with the accompanying drawing, wherein FIG. 1 is a sectional side elevation showing a plant (for example an orchid) with a planting ball in a pot, with small plastic rods used according to the present invention;

FIG. 2 is a perspective view of a small plastic rod, shown at approximately natural size;

FIG. 3 is a somewhat schematic perspective view of an inventive pot composed of small plastic rods; and FIG. 4 is a tubular structure of small plastic rods.

In FIG. 1, a planting ball 1 in a conventional pot 2 consists of peat moss. The planting ball is traversed by a plurality of small plastic rods 4. A seedling or plant 3 is anchored with its roots in the planting ball 1.

FIG. 2 shows, approximately with true natural dimensions, one of the plastic rods 4 used, according to the invention, in any of the exemplary embodiments of FIGS. 1, 3 and 4. The material, approximate size, preparation, behavior and other characteristics of these rod-shaped members will be described hereafter in more detail.

In the example shown in FIGS. 3 and 4, containers are formed by a number of small plastic rods 4 welded or caked together and filled with similar loose rods 4.

The closed-cell or non-porous and absorbent plastic rods 4 used as a carrier substance are preferably produced from polyvinyl chloride waste after blacking the material with ethylene soot, by rolling it into a foil and finally cutting it to size mechanically. If hydroponic basins or pots like that of FIG. 1 are charged with this material, then after pouring or pressing the carrier framework, a cavity proportion is formed of up to 90% which is far superior to any plant substrate used hitherto. The cavities formed may be adapted to the requirements of the individual plant, by being compressed to a greater or lesser extent; also, the width of the small rods may be varied. The preferred dimensions of rods 4 are 0.5–2 mm. with, 0.1–1 mm. thickness and 15–80 mm. length.

The inserted or sown plants can readily penetrate with their roots into the cavities of the substrate and develop there a healthy and extensive root system. On banking up, the nutrient solution used is extensively discharged, fresh air being induced into the cavities of the substrate which is quickly saturated with water vapor from the liquid retained on the small plastic rods. In this way, the roots and the root hairs are provided with optimum living and functional conditions.

In contradistinction to drawn small plastic rods having a circular cross-section, small rods of rectangular cross-section, although substantially elastic, are more readily deformed by pressure to a greater or lesser extent when charged into ornamental pots, namely buckled, whereby there are readily produced highly porous but nevertheless shape-retaining felted plant balls, as shown at 1 in FIG. 1.

Such solid plant balls are of great importance when selling or conveying potted plants and far superior to conventional substrates such as quartz or pumice gravel, vermiculite or even spherical or cylindrical plastic granulate which may roll or drop out.

Moreover the shape retention of the plant balls permits inspection of the root development at any time in the course of cultivation.

Chemical changes of the completely indifferent and water-soluble plastic material, even any damage to the plants cultivated therein by poisonous substances given off by the nutrient solution, cannot be ascertained even after years. Sorption phenomena by means of which the nutrient solution might undergo changes, as above all in brick chips, but also in pumice gravel and vermiculite, do not occur. The surfaces of the small rods 4 do not collect algae since the rods are perfectly opaque owing to the soot deposit in the compound. Moreover, the surface of the plant bed, where for reasons of light intensity algae growth would be conceivable, will rapidly dry off when moistened.

Considerable efflorescing of the nutrient salts, such as occurs when absorbent individual particles on the surface of the plant bed are drying off, is not observed. Even if the substrate has been used for years, purification of the nutrient solution may be carried out on the spot. This can be done in the culture basin itself by flooding with pure tempered water, possibly whilst lightly working through the material with a hoe or other tool. For ventilating the roots of the particularly valuable cultures it is possible without difficulty to have water vapor-saturated tempered air to be sucked in or forced through the substrate by means of a pumping device.

The small plastic rods 4, apart from being used as the sole substrate, may also be processed to form mixed substrates, for example when cultivating epiphytical orchids, mixed with fresh sphagnum (peat moss) at a volumetric ratio of 1:1. In this form the unvariably permanent and shape-retaining small plastic rods are far superior to the Osmanda roots of Italian origin which soon rot away, and even to the costly Japanese Osmanda roots. Detaching of the small plastic rods 4 from the plant ball 1 of such mixed substrates has not been observed if the rods are cut from foils as described.

Orchids cultivated in such mixed substrates differ in no way from those kept in a conventional plant substrate comprising a mixture of peat moss with Osmanda or polyposium roots. Root formation is excellent, the plant ball is uniformly traversed by the roots. New shoots of the orchids satisfy all demands with regard to size, solidity and color.

If it is intended to transplant into hydroponic substrates seedlings hitherto cultivated in soil, then it is not often possible to wash out the soil without causing grievous harm to the fine root system. The plants after being transplanted, thus require a long time to recover from the transplanting shock. On the other hand transplanting from soil to soil is generally successful without causing any interference with growth because the root system is transplanted together with a clump of soil and thus serious damage is avoided.

In accordance with the inventive concept of avoiding seeding pots, solid plant inserts are produced from the small plastic rods 4 which, provided with one or more germinating seeds, remain connected in a plant ball-like manner even without any pot. After the seedlings, like 3 shown in FIG. 1, have sufficiently developed, they can be transplanted therewith. The plastic plant insert fully ensures ventilation, water and nutrient salt absorption and also promotes undisturbed development of the root system. The seedlings are held in small basket-like, tubular or pot-like structures, as shown in FIGS. 3 and 4, formed by plastic rods 4 welded or caked together and filled with other plastic rods.

The procedure is based on the recognition that the small plastic rods 4 used as a substrate become plasticized at temperatures of more than 180° and become caked together. If, for example, the substrate is charged in a metal mold shaped like an ordinary flower pot or even in an iron tube having an inner width of 3 to 10 cm., and is heated from the outside to said temperature with a Bunsen burner, then the rods are caked together owing to their contact with the hot metal wall, to form a solid but highly porous basket. The interior of the latter contains the small plastic rods 4 heated to a lesser degree and which consequently have remained in loose formation.

It is also possible to produce highly porous pots, bowls or tubes by accordingly heating the small plastic rods in suitable molds. These pots and the like are then filled with the same kind of substrate. When containing seedlings cultivated therein, the pots may be transplanted without need for the seedlings to endure any changes. The roots of the plants grow unhindered through the wide aperture at the bottom of the pot or vessel, covered or stuffed with a loose rod-shaped substrate.

Pots or bowls of this kind also constitute suitable inserts for tank vessels as used in the hydroponic cultivation of decorative plants. Their porosity is higher than that of unglazed earthenware pots used hitherto extensively as inserts.

The foregoing disclosure relates only to a preferred embodiment of the invention, which is intended to include all changes and modifications of the examples described within the scope of the invention as set forth in the appended claims.

What I claim is:

1. A soilless plant culture substrate comprising a plurality of similar, closed-cell, plastic rod-shaped members, the substrate forming a support for plants and roots.

2. A soilless plant culture substrate according to claim 1, wherein said rod-shaped members have width of 0.5 to 2 millimeters, thicknesses of 0.1 to 1 mm., and lengths of 15 to 80 mm., approximately.

3. A soilless plant culture substrate according to claim 1, wherein the plastic material of the members consists essentially of polyvinyl chloride resin.

4. A soilless plant culture substrate according to claim 1, wherein said material is blacked.

5. A soilless plant culture substrate according to claim 1, wherein said members are randomly fused together to form a unitary, perforate, loosely felted mass.

6. A soilless plant culture substrate according to claim 5, wherein the fused members are formed into a hollow truncated cone closed at one end.

References Cited by the Examiner
UNITED STATES PATENTS

| | | | |
|---|---|---|---|
| 2,285,220 | 6/1942 | Morrell | 229—3.5 |
| 2,988,441 | 6/1961 | Pruitt | 71—27 |
| 3,000,722 | 9/1961 | Linnolt | 71—11 |

ABRAHAM G. STONE, *Primary Examiner.*